June 24, 1930.  W. F. WRATTEN  1,767,828
TRACK BED SPRAYER
Filed March 23, 1928   2 Sheets-Sheet 1
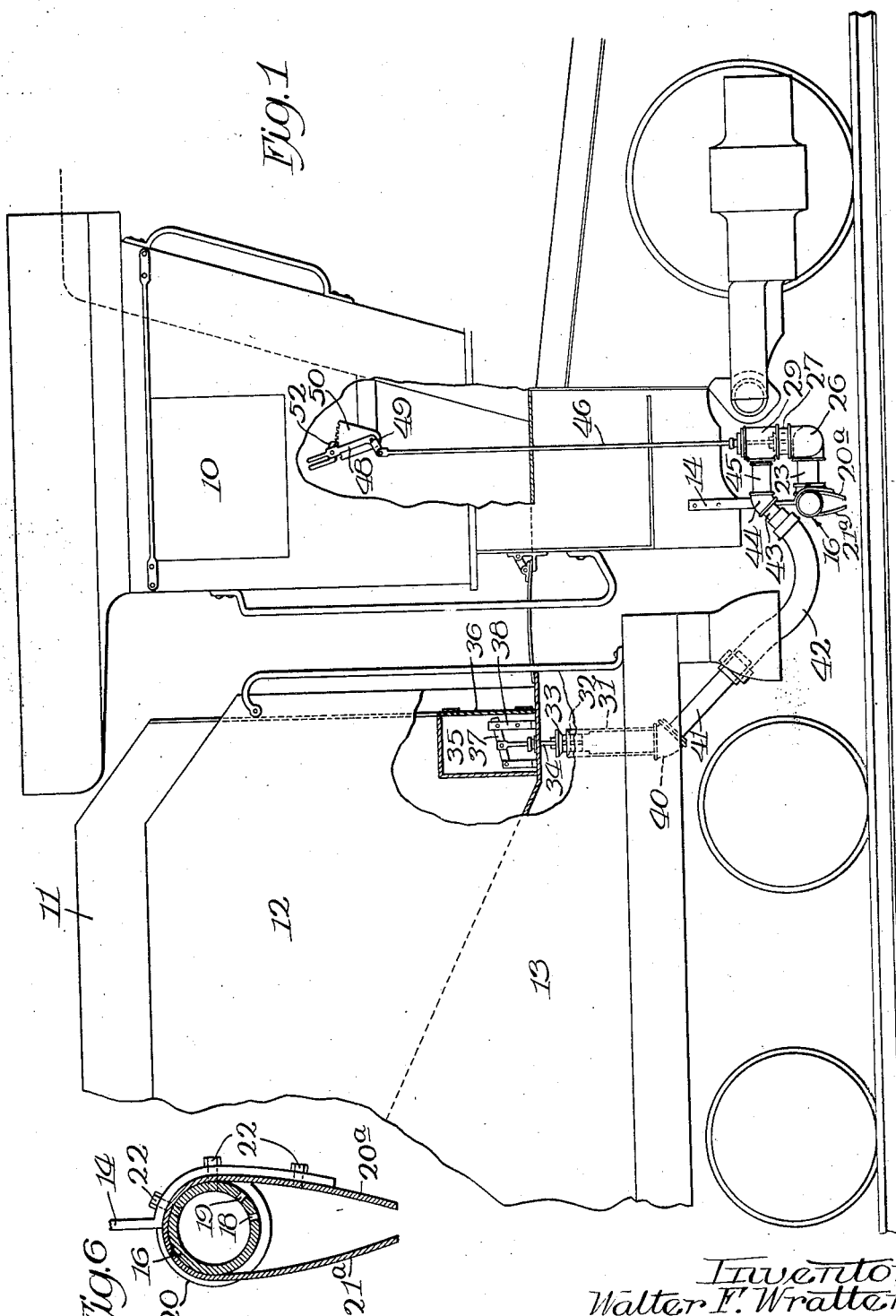

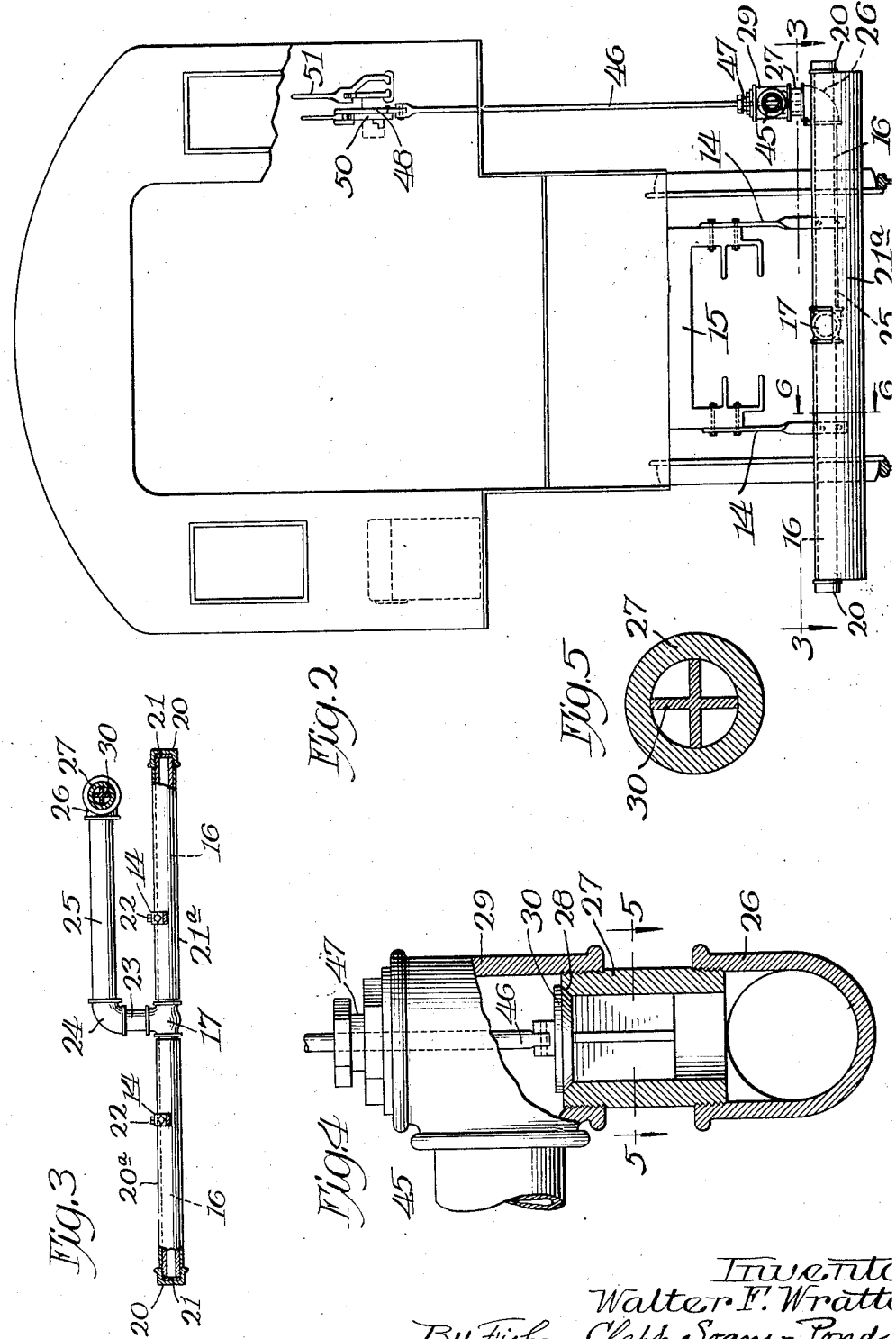

Patented June 24, 1930

1,767,828

UNITED STATES PATENT OFFICE

WALTER F. WRATTEN, OF FAIRBURY, NEBRASKA

TRACK-BED SPRAYER

Application filed March 23, 1928. Serial No. 264,126.

This invention relates to a class of devices commonly known as track-bed sprayers or sprinklers, designed to eliminate or reduce the dust evil on railway track-beds. Heretofore, so far as I am aware, these spraying accessories have been mounted on locomotive tenders, with the controlling valve thereof placed in an inconvenient location and one difficult of access and manipulation when the train is in motion. Furthermore, the controlling valve has heretofore been of such a character that the amount of water passed to the sprayer could not conveniently be regulated or graduated while the train is in motion to suit the conditions of the road-bed and avoid unnecessary waste of water; and since the spraying water is drawn from the same source as the feed water of the locomotive boiler, there was always the danger that the water tank might be exhausted by the sprayer before the locomotive reached the next water supply station. Again, in prior spraying devices of this character the water has been discharged directly onto the road-bed from a perforated sprinkler pipe beneath the tender, and the strong suction at the sides of the tender, when the train was in rapid motion, would draw most of the water out and discharge it beyond the sides of the road-bed and so fail to place the water where it would be most effective in laying dust.

Furthermore, a sprayer pipe on the tender tank frame locates the horizontal sprayer pipe too close to the tender truck wheels; so that, at a moderate or high rate of speed, with the spray pipe dispatching water to the road bed, the water strikes the road bed with sufficient force to throw gravel and cinders against the tread of the tank truck wheels causing the tread to become shelled, which calls for a renewal of wheels to permit the safe operation of passenger trains. In addition to this, the water from the sprayer pipe gets into the tank journal bearings. When the sprayer pipe is placed on the rear end of the locomotive frame, the distance of the sprayer pipe from the tender wheels is sufficient to overcome these difficulties.

The primary object of my present invention has been to provide a railway road-bed sprayer that would be free from the above-noted faults and defects of prior devices of this character; more specific positive objects being,—to provide a road-bed sprayer on the locomotive, with a valve that can be operated by the engineer from the engineer's cab; to provide a sprayer which cannot exhaust all the water in the tender tank, thus avoiding stalling of the train between filling stations, to provide a sprayer that can be made free from danger of freezing in sub-freezing weather, and to provide, in association with the sprinkler pipe, means by which the water may be discharged in the form of a single wide spray or sheet, rather than in individual jets, and will be deposited directly onto the underlying road-bed.

Other objects and attendant advantages of the invention will be apparent to persons skilled in the art as the same becomes better understood by reference to the following detailed description, taken in connection with the accompanying drawings, in which I have illustrated a practical and preferred embodiment of the invention, and wherein—

Fig. 1 is a diagrammatic side elevation of the rear or cab portion of a locomotive and the forward portion of the tender, showing my improved spraying device applied thereto;

Fig. 2 is a similar rear elevation of the locomotive, showing the preferred location of the sprayer valve-actuating lever and quadrant;

Fig. 3 is a horizontal section on the line 3—3 of Fig. 2;

Fig. 4 is an enlarged detail view, partly in elevation and partly in vertical section, of the sprayer valve;

Fig. 5 is a horizontal section on the line 5—5 of Fig. 4;

Fig. 6 is an enlarged cross-section on the line 6—6 of Fig. 2.

Referring to the drawings, in Fig. 1, I have shown conventionally the rear end or cab portion 10 of a locomotive and at 11 the forward end portion of the usual tender, including the coal bin 12 and the water tank 13.

Suspended by hangers 14 from the rear truck frame 15 of the locomotive is the sprinkler pipe, consisting, in the instance shown, of a pair of horizontal pipe sections 16 disposed end to end and united by a T-coupling 17. As shown in Fig. 6, this pipe is formed preferably with a pair of longitudinal rows of spray apertures 18 and 19 located in the lower forward quarter of the circumference of the pipe. The pipe is closed at its ends as by threaded caps 20 and disc packings 21, or otherwise, so that all the water admitted thereto is discharged through the jet apertures 18 and 19. Surrounding the pipe 16 and resting upon the upper half thereof is a sheet-metal member of generally inverted U-shape, the depending sides of which extend some distance below the pipe, the forward side 20$^a$ constituting a baffle against which the jets from the pipe impinge, and the rear side 21$^a$ constituting a shield to prevent the sucking out action of air when the train is in motion. The pipe and its enclosing member may both be attached to the lower bent ends of the hangers 14 as by machine screws 22 passed therethrough.

By reference to Fig. 6 it will be observed that the portion of the baffle plate 20$^a$ extending below the spray pipe is downwardly and rearwardly inclined with reference to the direction of normal travel, and the corresponding portion of the shield plate 21$^a$ is downwardly and forwardly inclined, both plates being preferably slightly curved transversely, and that the narrow discharge opening between the lower edges of said plates is of less width than the diameter of the spray pipe. This construction insures the conversion of the spray into a film or sheet of water, and also insures against the destruction of this film or sheet before it leaves the baffle plate through the action of suction on the rear of the latter.

Referring to Fig. 3, communicating with the T 17 is a supply pipe consisting in the instance shown, of a short pipe section 23 connected into the stem of the T 17, an elbow coupling 24, a pipe section 25 parallel with the sprinkler pipe 16, an upwardly turned elbow 26 on the outer end of the pipe section 25, a short vertical pipe section 27 (Fig. 4) formed on its upper end with a valve seat 28, and the vertically disposed head of a T-coupling 29 screwing onto the pipe section 27 and constituting a chamber for a wing valve 30 that cooperates with the pipe section 27 and its valve seat 28.

In the floor of the water tank 13 is mounted a vertical pipe section 31, the upper end of which is formed with a valve seat 32 similar to the valve seat 28, and cooperating therewith is a wing valve 33 similar to the wing valve 30. The stem 34 of the valve 33 extends upwardly through a suitably packed opening in the top of the water tank 13 into a small closet 35 partitioned off from the space of the fuel bin, access being had thereto by a door 36. Within the closet 35 the upper end of the valve stem 34 is connected to a hand lever 37 that may be secured by a cross-pin or otherwise to a post 38 so as to lock the valve 33 in either fully opened or fully closed position. The lower end of the pipe 31 is connected into the T 29 by a pipe and hose line comprising, in the instance shown, an elbow 40, a pipe section 41, a flexible hose section 42 of sufficient length to accommodate the maximum play between the locomotive and the tender, a short pipe section 43 to which the forward end of the hose 42 is detachably clamped, an elbow 44, and a short pipe section 45 leading into the stem of the T 29.

To the valve 30 is connected a valve-operating rod 46 that extends upwardly through a suitable packing 47 on the valve casing 29 and at its upper end is pivotally connected to the lower end of an elbow lever 48 pivoted at 49 on a segment rack 50 suitably mounted in the engineer's cab, preferably alongside of the usual reversing lever which is indicated at 51 in Fig. 2. The lever 48 is provided with the usual dog 52 cooperating with the teeth of the rack to hold the lever in any set position.

In the practical operation of the sprayer, before starting on a run the engineer or fireman first opens the valve 33 in the water tank by raising the lever 37 to, and locking it in, the raised position shown in Fig. 1. This floods the valve casing 29 and the pipe and hose connection leading thereto; and when the engineer desires to wet down the road bed, which is mainly done at and in the vicinity of railway stations, he simply swings the lever 48 forwardly which opens the valve 30 and permits the water to flow to the sprayer pipe. If only a slight spraying is deemed necessary or desirable, the valve can be opened and locked open but a short distance; whereas if the road-bed is very dusty and a heavy spray is necessary, the valve can be opened wide to afford a thorough wetting of the track bed. Any desired volume of water, usually varying in practice between 15 and 287 gallons per minute, can be sprayed onto the track-bed.

If, during spraying, the water level in the tank falls to the top of the pipe 31, manifestly the spraying will automatically cease, thus conserving a sufficient amount of water in the tank to fulfill the requirements of the boiler to the next filling station.

In sub-freezing weather, the valve 33 in the tank may be closed, and the hose 42 disconnected from the pipe section 43 and drained, thus avoiding any danger of clogging the flow connections by ice.

In the operation of the sprayer discharge pipe, the jets issuing through the jet apertures 18 and 19 impinge upon the opposed inner face of the baffle 20ª and form a practically continuous thin sheet of water which is discharged from the lower end of the baffle. The opposite shield 21ª serves to confine the air suction caused by the rapid movement of the train mainly to the relatively narrow mouth or slit formed between the lower edges of the baffle 20ª and the shield 21ª, thus pulling the water downwardly and insuring the deposit of the water on the road-bed.

The wing valves 30 and 33 are of especial advantage and utility in a track spraying device, mainly because they are both quick-action valves, especially quick closing valves, since the instant they are released from locked open position the weight and suction of the water tends to close them instantly. This is an advantage since it enables the engineer to instantly close the main valve 30 on leaving a section of track which requires wetting down, without any waste of water. No other type of valve with which I am acquainted is equally efficient for this purpose.

I have herein shown and described one simple and practical embodiment of the invention, but it is manifest that many of the details of structure and arrangement may be varied to suit varying conditions of installation without involving any departure from the invention or sacrificing any of the advantages thereof. Hence, I do not limit the invention to the specific structural details illustrated but reserve such variations and modifications as fall within the spirit and purview of the claims.

I claim:—

1. In a track-bed sprayer, the combination with a spray pipe mounted on and beneath the rear end of a locomotive, of a water supply line from the tender tank to said spray pipe, a valve controlling said water supply line, and a valve opening and closing means extending into and operable from the engineer's cab.

2. In a track-bed sprayer, the combination with a spray pipe mounted on and beneath the rear end of a locomotive, of a water supply line from the tender tank to said spray pipe, a valve controlling said water supply line, a valve actuating rod extending from said valve into the engineer's cab, a lever connected to said rod, and means for locking said lever in any set position whereby to vary as desired the rate of flow through said valve.

3. In a track-bed sprayer, the combination with a spray pipe mounted on and beneath the rear end of a locomotive, of a water supply line from the tender tank to said spray pipe including a valve casing, a vertically movable wing valve in said valve casing, a valve-actuating rod extending upwardly from said valve into the engineer's cab, a lever connected to said rod, a segment rack, and a lever locking pawl on said lever cooperating with said segment rack.

4. In a track-bed sprayer, the combination with a spray pipe mounted on and beneath the rear end of a locomotive, of a water supply line from the tender tank to said spray pipe, said line including a vertical pipe extending through and above the bottom of the tender tank, a manually operable valve controlling the admission of water to said pipe, another valve controlling said water supply line, and means extending into and operable from the engineer's cab for opening and closing said last-named valve.

5. In a track bed sprayer, the combination with a railway truck frame, of a substantially horizontal spray pipe mounted on said frame, said pipe being close at its ends and formed with one or more rows of forwardly and downwardly directed spray apertures, a baffle plate mounted opposite the forward apertured side of said pipe, said baffle plate having a downwardly and rearwardly inclined portion below said pipe on which the jets of the latter impinge and are formed into a water film or sheet, and a shield depending from the rear side of said pipe for modifying the effect of suction on the sprayer discharged from said pipe.

6. In a track bed sprayer, the combination with a railway truck frame, of a substantially horizontal spray pipe suspended from said frame, said pipe being closed at its ends and formed with one or more rows of forwardly and downwardly directed spray apertures, a baffle plate mounted opposite the forward apertured side of said pipe, said baffle plate having a downwardly and rearwardly curved portion below said pipe on which the jets of the latter impinge and are formed into a water film or sheet, and a shield plate mounted opposite the rear side of said pipe, said shield plate having a downwardly and forwardly curved portion below said pipe; the discharge opening between the lower edges of said plates being narrower than the diameter of said pipe.

WALTER F. WRATTEN.